United States Patent
Nakamura et al.

[11] Patent Number: 5,572,080
[45] Date of Patent: Nov. 5, 1996

[54] SQUIRREL-CAGE ROTOR FOR INDUCTION MOTOR

[75] Inventors: Kosei Nakamura, Yamanashi; Yoshiyuki Hayashi, Shizuoka; Hisashi Maeda, Yamanashi, all of Japan

[73] Assignee: Fanuc Ltd., Yamanashi, Japan

[21] Appl. No.: 318,885

[22] PCT Filed: Feb. 24, 1994

[86] PCT No.: PCT/JP94/00301

§ 371 Date: Jan. 6, 1995

§ 102(e) Date: Jan. 6, 1995

[87] PCT Pub. No.: WO94/19858

PCT Pub. Date: Sep. 1, 1994

[30] Foreign Application Priority Data

Feb. 24, 1993 [JP] Japan ................. 5-035677

[51] Int. Cl.⁶ .................................. H02K 7/16
[52] U.S. Cl. .................................. 310/211
[58] Field of Search .................. 310/197, 201, 310/211

[56] References Cited

U.S. PATENT DOCUMENTS

| | | | |
|---|---|---|---|
| 2,048,421 | 7/1936 | Ballentine | 310/211 |
| 3,113,230 | 12/1963 | Linkous | 310/211 |
| 3,213,306 | 10/1965 | Summers et al. | 310/211 |
| 3,758,800 | 9/1973 | McLaughlin | 310/211 |
| 3,778,652 | 12/1973 | Endress | 310/211 |
| 4,309,635 | 1/1982 | Sei et al. | 310/211 |

FOREIGN PATENT DOCUMENTS

| | | | |
|---|---|---|---|
| 0 341 317 A1 | 11/1989 | European Pat. Off. | |
| 1023520 | 1/1958 | Germany | 310/211 |
| 2628522 | 1/1978 | Germany | 310/211 |
| 83 05 232.1 | 4/1986 | Germany | |
| 53-146009 | 11/1978 | Japan | |
| 56-71442 | 6/1981 | Japan | 310/197 |
| 60-192673 | 12/1985 | Japan | |
| 2089583 | 6/1982 | United Kingdom | |

OTHER PUBLICATIONS

"Querströme in Käfigläufern," Stepina, *E&M; Elektrotechnik und Mascinenbebau*, vol. 92, No. 1, 1992, pp. 8–14.

Primary Examiner—Clayton E. LaBalle
Attorney, Agent, or Firm—Nikaido, Marmelstein, Murray & Oram LLP

[57] ABSTRACT

A squirrel-cage rotor 10 includes a plurality of slots 16 for accommodating secondary conductors 18 along the outer circumferential surface of a laminated core 14 fixed to a rotor shaft 12. Each slot 16 is defined by a wall having a generally elliptical profile in which a maximum circumferential distance D is larger than a maximum radial distance d in a given section orthogonal to an axis and axially penetrates near the outer circumferential surface of the laminated core 14. The radial inner profile of the slot 16 has a shape in which the tangents on given two points adjacent to the radial innermost portion of each slot wall do not cross at an acute angle in a section orthogonal to the axis, in order to prevent a stress concentration.

4 Claims, 4 Drawing Sheets 5,572,080

SQUIRREL-CAGE ROTOR FOR INDUCTION MOTOR

TECHNICAL FIELD

The present invention relates to an induction motor, and more particularly to a squirrel-cage rotor for a high-speed induction motor.

BACKGROUND ART

In a squirrel-cage rotor for an induction motor, a laminated core made by stacking magnetic materials, such as silicon steel plates, is provided with a plurality of slots for disposing secondary conductors therein. These slots axially extend along the outer circumferential surface of the laminated core, and are arranged at generally equal intervals in a circumferential direction. Particularly, in a high-speed induction motor used as, e.g., a spindle motor of a machine tool, the slots of a rotor are formed as axial through holes which do not open at the outer circumferential surface of a laminated core. The slots shaped as through holes in a conventional squirrel-cage rotor are generally provided with a circular profile, or a generally elliptical profile of which a major axis is oriented in the radial direction of the laminated core, in a section orthogonal to the axis of the rotor.

When the squirrel-cage rotor rotates at high speed, stress due to centrifugal force is caused in the laminated core. This stress is concentrated particularly on the minimum radius portions in relation to a center of rotation, i.e., the innermost radial portions, of the walls of the slots of the laminated core. If such a stress concentration exceeds the elastic limit of the material forming the laminated core, a permanent set or a crazing arises on the radial innermost portions of the slot walls of the laminated core. The degree of the stress concentration becomes larger when the crossing angle of the tangents on two given points adjacent to the radial innermost portion of each slot wall becomes smaller in a section orthogonal to the axis.

Even if the slots have sectional shapes which easily lead to stress concentration on the radial innermost portions of the slot walls, the stress concentration caused on the slot walls during the high-speed rotation of the rotor does not become very problematic, as long as the diameter of the laminated core is relatively small. However, in the case of a squirrel-cage rotor of a high-power induction motor, having a laminated core with a larger diameter, is rotated at high speed, the problem arises in the slots having a circular section or a generally elliptical section of which a major axis is oriented in the radial direction of the laminated core, that the stress concentration caused on the slot walls may damage the laminated core.

DISCLOSURE OF THE INVENTION

The object of the present invention is to provide a squirrel-cage rotor for an induction motor, which can reduce the stress concentration caused on the slot walls of a laminated core and increase the maximum rotation speed at which rotor can operate without the occurrence of permanent set in the laminated core, so as to enable a high-power induction motor having a large diameter rotor to be rotated at high speed.

To accomplish the above object, the present invention provides a squirrel-cage rotor for an induction motor, comprising a rotor shaft; a laminated core coaxially fixed to the shaft and having a plurality of slots axially penetrating near an outer circumferential surface of the core, each of the slots being defined by a wall having a predetermined profile which has a maximum circumferential distance larger than a maximum radial distance in a given section orthogonal to an axis; and a conductor portion including a plurality of secondary conductors arranged in the slots of the laminated core and a pair of end rings connected to the secondary conductors at both axial ends of the laminated core.

In the preferred embodiment of the present invention, each of the slots of the laminated core is defined by a wall having a generally elliptical profile of which a major axis is oriented in a circumferential direction in a given section orthogonal to an axis. Alternatively, each of the slots of the laminated core may be defined by a wall drawing different circular arcs in a given section orthogonal to an axis. Also, it is preferred that the wall of each of the slots includes a radial outer portion extending generally parallel to the outer circumferential surface of the laminated core.

BRIEF DESCRIPTION OF THE DRAWINGS

The foregoing and the other objects, features, and advantages of the present invention will be described in relation to the embodiments shown in the accompanying drawings, in which.

BEST MODE OF CARRYING OUT THE INVENTION

Figure 1:
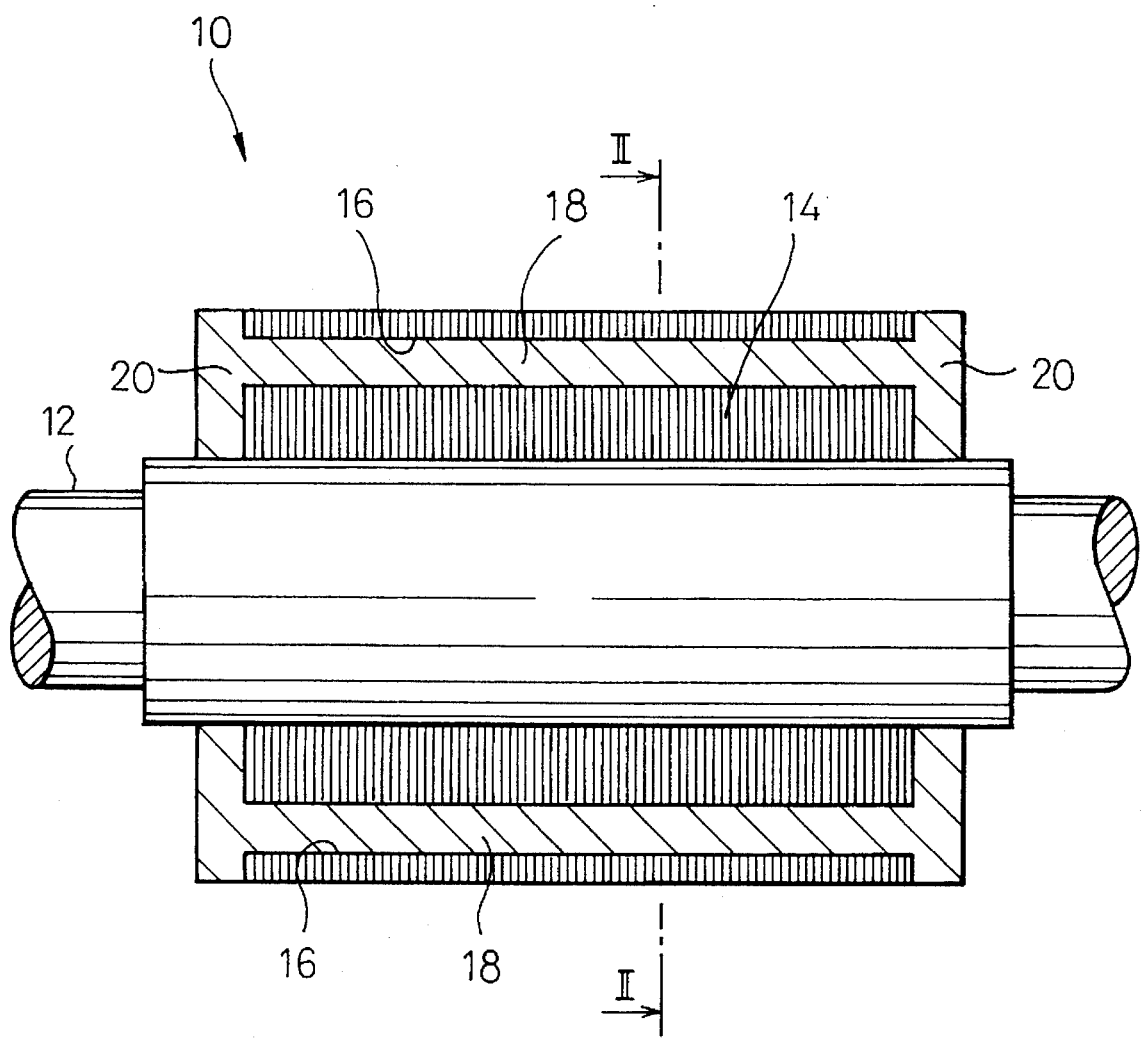
FIG. 1 is an axial sectional view of a squirrel-cage rotor according to the embodiment of the present invention.

Referring to the drawings, FIG. 1 shows a squirrel-cage rotor 10 for an induction motor, according to the embodiment of the present invention. The squirrel-cage rotor 10 includes a rotor shaft 12, a laminated core 14 made by stacking magnetic laminations such as silicon steel plates and fixed to the rotor shaft 12, a plurality of secondary conductors 18 arranged respectively in a plurality of slots 16 which are formed along the outer circumferential surface of the laminated core 14 so as to axially penetrate through the core, and a pair of end rings 20 arranged at both axial ends of the laminated core 14 and connected to the secondary conductors 18. The secondary conductors 18 and the end rings 20 are assembled with the laminated core 14 after being formed as separate members, or integrally formed with the laminated core 14 by a casting process such as an aluminum die-casting.

Figure 2:
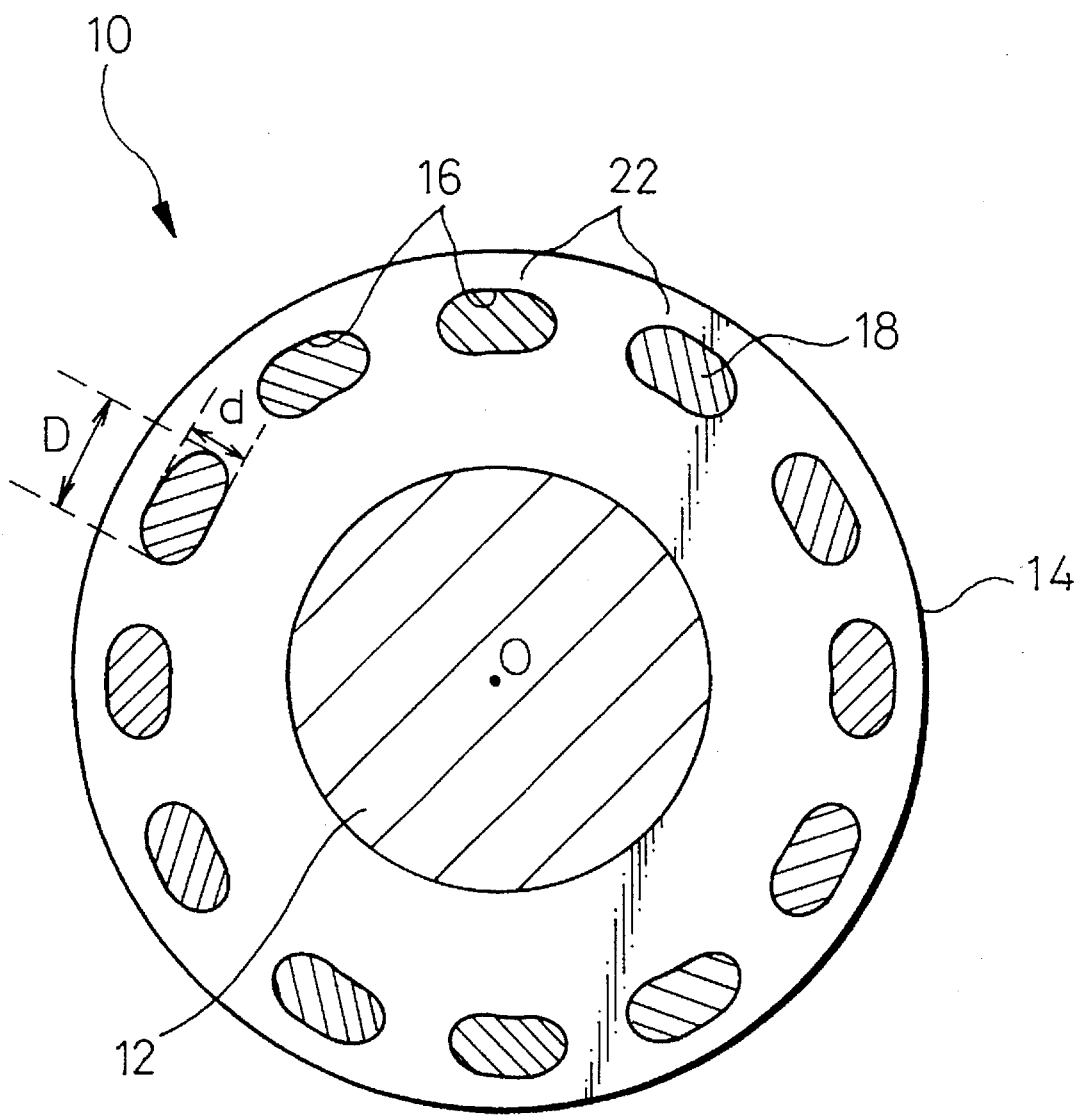
FIG. 2 is a sectional view taken along line II—II of FIG. 1.

As shown in FIG. 2, each slot 16 of the laminated core 14 is defined near the outer circumferential surface of the laminated core 14 by a wall having a generally elliptical profile in which the dimension of a maximum circumferential distance D is larger than that of A maximum radial distance d in a given section orthogonal to an axis. It should be noted that the term "generally elliptical" used herein represents various shapes, such as an ellipse, a shape obtained by a locus of a circle moved in a predetermined direction, or a polygon of which corners are provided with predetermined curvatures, as mentioned below.

Preferably, the radial outer wall of each slot 16 includes a part extending generally parallel to the outer circumferential surface of the laminated core 14. It is also preferred that outer edge portions 22 of the laminated core 14 defining the radial outer walls of the slots 16 extend in a circumferential direction while keeping as small radial dimensions as possible, so far as the secondary conductors can be surely supported during a high-speed rotation. According to this construction, the magnetic resistance of a magnetic circuit in the induction motor having the squirrel-cage rotor 10 can be reduced. Further, it is preferred that the profile of the radial inner wall of each slot 16 does not have an acute-angle portion to prevent the stress concentration, i.e., the tangents on two given points adjacent to the radial innermost portion of each slot wall do not cross at an acute angle in a section orthogonal to the axis.

Figure 3:
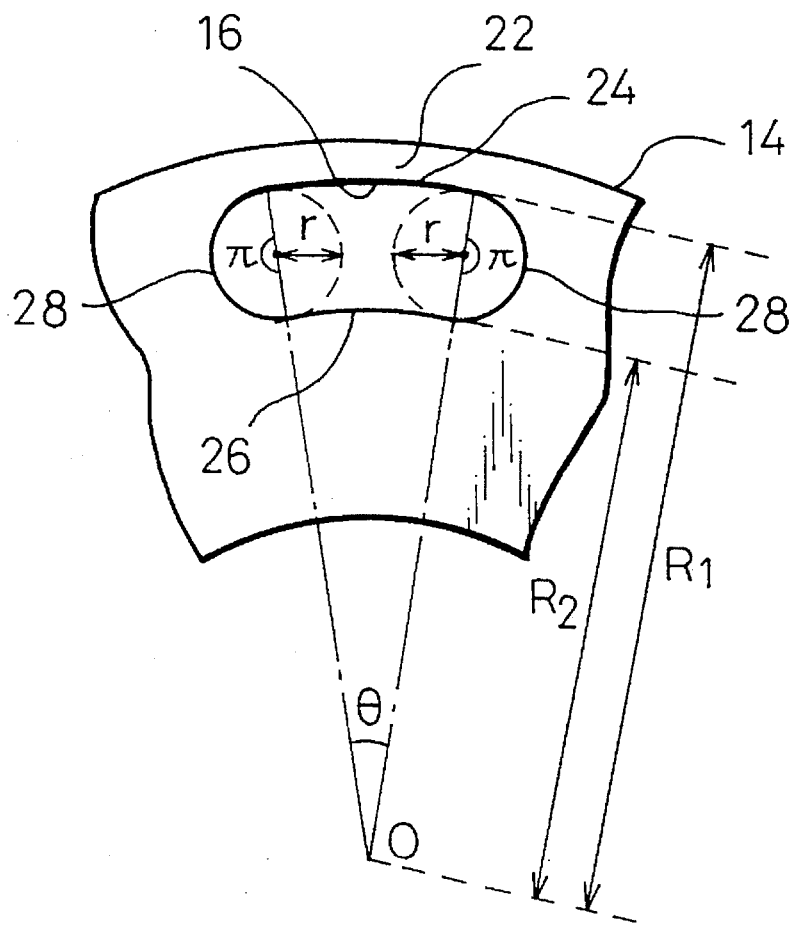
FIG. 3 is an enlarged partial end view of a laminated core of the squirrel-cage rotor, which shows a sectional shape of a slot formed in the laminated core.

FIG. 3 shows the profile of the slot 16 according to the preferred embodiment, which can reduce the stress concentration on the slot wall, in a given section orthogonal to the axis of the rotor 10. The profile of the slot 16 in this case consists of a curved elliptical shape such as a kidney shape obtained by a locus drawn by a circle with a predetermined radius r, the circle being rotated in an arc at a given angle θ about a center of rotation O of the rotor 10. Therefore, the kidney shaped profile of the slot 16 is defined by an outer circular arc 24 with a radius $R_1$ and a central angle θ near the outer circumferential surface of the laminated core 14, an inner circular arc 26 with a radius $R_2$ and a central angle θ near the inner circumferential surface of the laminated core 14, and a pair of circular arcs 28 with radii r and central angles π which connect the outer circular arc 24 and the inner circular arc 26 at both circumferential ends of these arcs. The applicants of the present application have observed that, when the slot 16 has this profile, the stress concentration on the slot wall within the laminated core 14 becomes smallest.

Figure 4A:
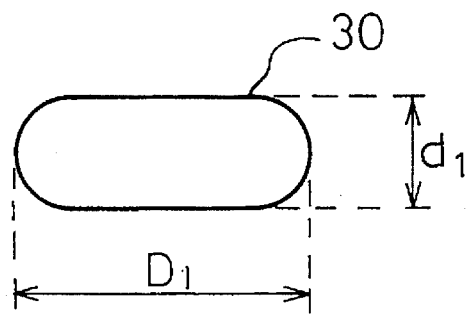
FIGS. 4A to 4C show the other embodiments of profiles of slots formed in the laminated core of the squirrel-cage rotor shown in FIG. 1.
Figure 4B:
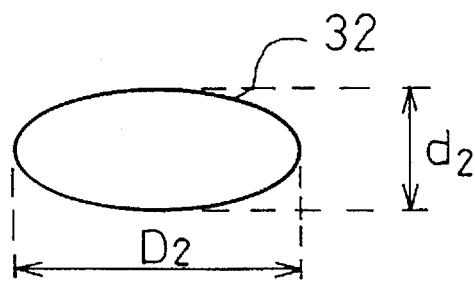
Figure 4C:
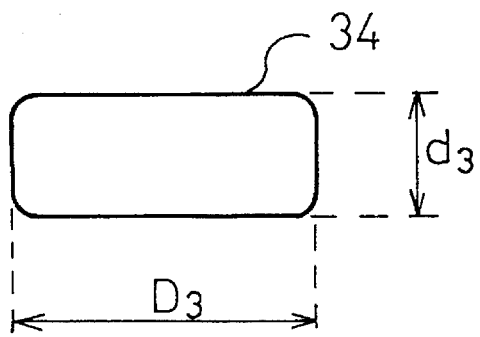

FIGS. 4A to 4C show various profiles of slots of a squirrel-cage rotor according to the other embodiments of the present invention, in a given section orthogonal to the axis. The slot 30 shown in FIG. 4A has a profile of a shape obtained by a locus drawn by a circle with a diameter $d_1$, the circle being moved in a straight line a distance $(D_1-d_1)$ on a given plane. The slot 32 shown in FIG. 4B has a profile of an ellipse with a major axis $D_2$ and a minor axis $d_2$. The slot 34 shown in FIG. 4C has a profile of a rectangle with a long side $D_3$ and a short side $d_3$, of which four corners are rounded by a predetermined curvature. In the case of $d_1=d_2=d_3$ and $D_1=D_2=D_3$, the stress concentration on a slot wall is smallest for the slot 30 of FIG. 4A and is largest for the slot 34 of FIG. 4C among these slots. However, even in the case of the slot 34, it has been observed that the stress concentration on a slot wall is smaller than the case of a slot having a circular profile.

The present invention has been described in relation to the embodiment shown in the attached drawings, but is not restricted by the above descriptions, and various changes and modifications can be carried out without departing from the spirit and scope of the invention recited in the appended claims.

[Industrial Applicability]

According to the present invention, a stress which tends to concentrate on the walls of slots for secondary conductors provided in a laminated core can be reduced. Therefore, by using the squirrel-cage rotor of the present invention, the maximum rotation speed that does not lead to the occurrence of permanent set in the laminated core is increased, and thus it becomes possible to produce an induction motor for high-speed rotation. Further, even in a high-torque induction motor having a laminated core with a large diameter, high-speed rotation can be attained without damaging the rigidity of the laminated core.

We claim:

1. A squirrel-cage rotor for an induction motor, comprising:

a rotor shaft;

a laminated core coaxially fixed to said shaft and having a plurality of slots axially penetrating near an outer circumferential surface of said core, each of said slots being defined by a wall having a predetermined profile which has a maximum circumferential distance larger than a maximum radial distance in a given section orthogonal to an axis; and a conductor portion including a plurality of secondary conductors arranged in said slots of said laminated core and a pair of end rings connected to said secondary conductors at both axial ends of said laminated core, wherein each of said slots of said laminated core is defined by a wall having a generally elliptical profile of which a major axis is oriented in a circumferential direction in a given section orthogonal to an axis.

2. A squirrel cage rotor for an induction motor comprising:

a rotor shaft a laminated core coaxially fixed to said shaft and having a plurality of slots axially penetrating said core near an outer circumferential surface thereof and consisting exclusively of slots defined by a wall having a predetermined profile of generally elliptical shape which has a minimum dimension in a circumferential direction larger than a maximum dimension in a radial direction measured in an orthogonal section of said core; and a conductor portion including a plurality of secondary conductors filling said slots and a pair of end rings connected to said secondary conductors at both axial ends of said laminated core, the core and secondary conductors sectional shapes being such that stress concentration at high rotational speed of said rotor is reduced.

3. A squirrel-cage rotor as set forth in claim 2, wherein each of said slots of said laminated core is defined by a wall drawing different circular arcs in a given section orthogonal to an axis.

4. A squirrel-cage rotor as set forth in claim 2, wherein said wall of each of said slots includes a radial outer portion extending generally parallel to the outer circumferential surface of said laminated core.

\* \* \* \* \*